United States Patent
Yoshida et al.

(10) Patent No.: US 10,982,590 B2
(45) Date of Patent: Apr. 20, 2021

(54) ENGINE WITH SUPERCHARGER

(71) Applicant: Mazda Motor Corporation, Hiroshima (JP)

(72) Inventors: Ken Yoshida, Hiroshima (JP); Ryotaro Nishida, Hiroshima (JP); Hidesaku Ebesu, Hiroshima (JP); Shuhei Tsujita, Hatsukaichi (JP); Hisayuki Yamane, Aki-gun (JP); Masafumi Nakano, Hiroshima (JP); Taketoshi Yamauchi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/640,905

(22) PCT Filed: Aug. 25, 2017

(86) PCT No.: PCT/JP2017/030516
§ 371 (c)(1),
(2) Date: Feb. 21, 2020

(87) PCT Pub. No.: WO2019/038912
PCT Pub. Date: Feb. 28, 2019

(65) Prior Publication Data
US 2020/0182134 A1 Jun. 11, 2020

(51) Int. Cl.
*F02B 29/04* (2006.01)
*F02M 35/10* (2006.01)

(52) U.S. Cl.
CPC ...... *F02B 29/0443* (2013.01); *F02B 29/0462* (2013.01); *F02M 35/10157* (2013.01); *F02M 35/10327* (2013.01)

(58) Field of Classification Search
CPC .. F02B 29/0443; F02B 29/0462; F02B 29/04; F02B 39/00; F02M 35/10157; F02M 35/10327; F02M 35/10; Y02T 10/12
See application file for complete search history.

(56) References Cited

U.S. PATENT DOCUMENTS

| 3,447,313 A | 6/1969 | Stoffel et al. |
| 9,103,304 B2 | 8/2015 | Hommes et al. |

FOREIGN PATENT DOCUMENTS

| BE | 535800 A | 3/1955 |
| DE | 1138979 B | 10/1962 |
| EP | 3093465 A1 | 11/2016 |
| JP | H01174522 U | 12/1989 |
| JP | H08312359 A | 11/1996 |
| JP | H09228846 A | 9/1997 |
| JP | 2006299852 A | 11/2006 |
| JP | 2013147954 A | 8/2013 |
| WO | 9802653 | 1/1998 |

*Primary Examiner* — Audrey K Bradley
*Assistant Examiner* — Edward Bushard
(74) *Attorney, Agent, or Firm* — Alleman Hall Creasman & Tuttle LLP

(57) ABSTRACT

The present disclosure provides sufficient support rigidity of a supercharger and an intercooler, while reducing an increase in the overall height of an engine. The supercharger extends along a cylinder bank at a side of a surge tank, and is fixed to an intake manifold. The intercooler is located below the supercharger. A case of the intercooler is connected to a discharge port of the supercharger and an intake air introduction pipe of the intake manifold.

12 Claims, 7 Drawing Sheets

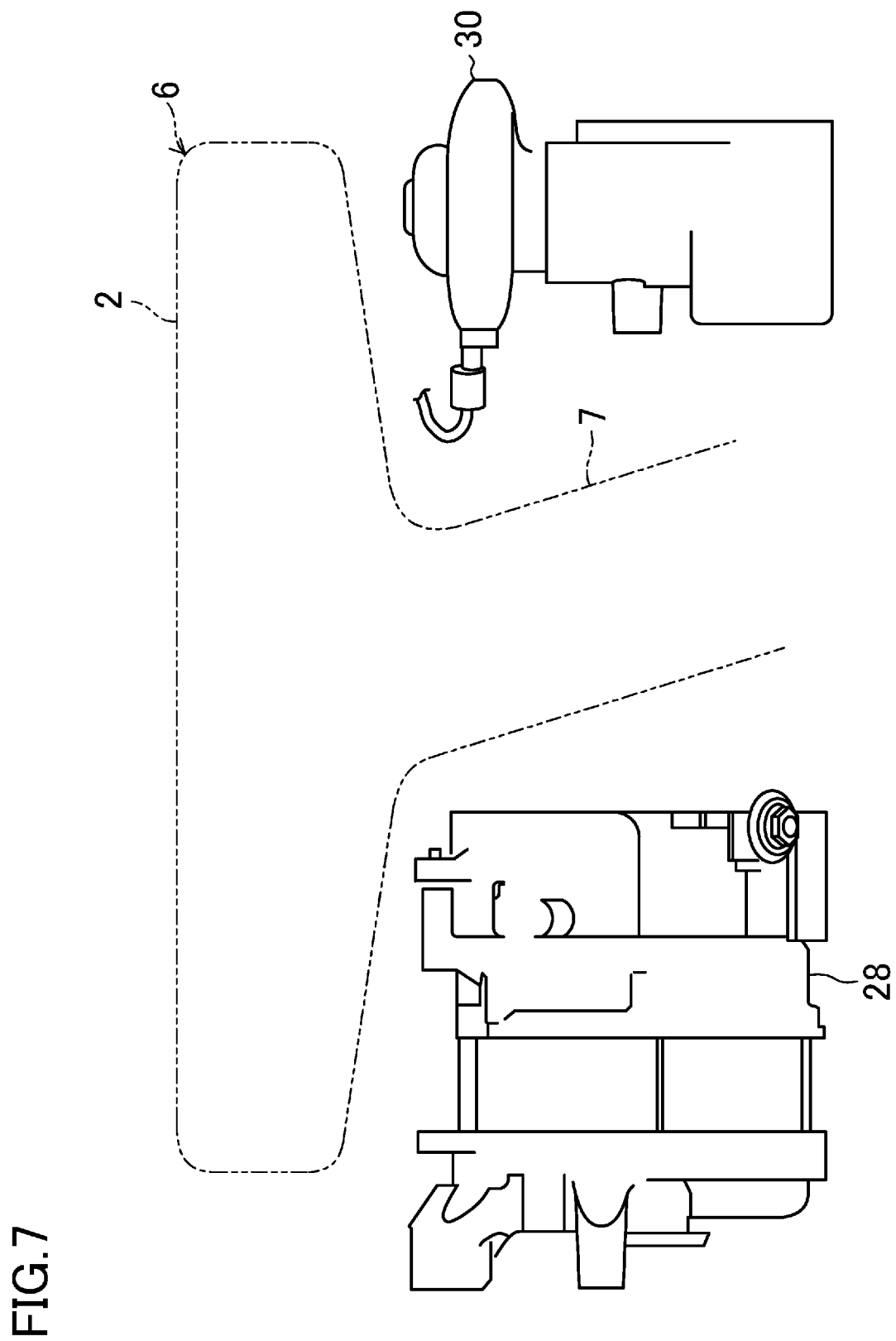

ENGINE WITH SUPERCHARGER

TECHNICAL FIELD

The present invention relates to an engine with a supercharger.

BACKGROUND ART

Patent Document 1 describes an example of a multi-cylinder engine with a supercharger. In this example, a mechanical supercharger driven by the engine extends along a cylinder bank below a surge tank and is attached to a side of a cylinder block. An intercooler is located above the surge tank. The intercooler is supported on the engine main body by two stays.

CITATION LIST

Patent Document

PATENT DOCUMENT 1: Japanese Unexamined Patent Publication No. H08-312359

SUMMARY OF THE INVENTION

Technical Problem

The arrangement of the intercooler above the surge tank is advantageous in preventing condensed water of intake air from remaining in the intercooler but increases the overall height of the engine. In this case, the design constraints of a motor vehicle increase. For example, it is difficult to lower a bonnet line. An intercooler in a higher position has a problem in providing sufficient support rigidity. In the case of a water intercooler, how to route a cooling water circulation pipe is also a problem.

To address the problems, the present invention aims to easily provide sufficient support rigidity of a supercharger and an intercooler, while reducing an increase in the overall height of an engine.

Solution to the Problem

In order to achieve the objective, the present invention organically associates the arrangement of a supercharger and an intercooler in view of the overall height of an engine and the support rigidity of the intercooler, for example.

Disclosed herein is an engine with a supercharger. The engine includes: an intake manifold including a surge tank connected to intake ports of cylinders of the engine that is a multi-cylinder engine, and an intake introduction pipe integral with the surge tank; a supercharger configured to compress intake air and supply the compressed intake air to the surge tank; and an intercooler configured to cool the intake air discharged from the supercharger. The supercharger extends along the cylinder bank at a side of the surge tank, and is fixed to the intake manifold. The intercooler is located below the supercharger. A case housing a cooler core of the intercooler includes an intake air inlet connected to a discharge port of the supercharger, and an intake air outlet connected to the intake air introduction pipe of the intake manifold.

According to this configuration, the supercharger is located at the side of the surge tank, which prevents the supercharger from increasing the overall height of the engine. The placement of the intercooler below the supercharger prevents the intercooler from increasing the overall height of the engine.

In this manner, the supercharger is fixed to the intake manifold. The intake manifold can thus be utilized to support the supercharger, thereby easily providing sufficient support rigidity of the supercharger. On the other hand, the intercooler is connected to the discharge port of the supercharger and the intake air introduction pipe of the intake manifold. The supercharger and the intake manifold can thus be utilized to support the intercooler, thereby easily providing sufficient support rigidity of the intercooler.

In one aspect, a lower part of the case of the intercooler is supported by a cylinder block. This configuration easily provides sufficient support rigidity of the intercooler.

In another aspect, the cooler core of the intercooler is a water cooler core. In the case of a water cooler core, how to route the cooling water circulation pipe is a problem. As pointed out above, the intercooler is located in a lower position below the supercharger. This arrangement facilitates the routing of the cooling water circulation pipe that connects even a radiator located in a lower position in front of the engine to the intercooler. In addition, the cooling water circulation pipe is shortened and requires a smaller amount of the cooling water, which is advantageous in reducing the weight of a motor vehicle.

In another aspect, the supercharger is a mechanical supercharger driven by an output shaft of the engine. An engine accessory driven by the output shaft of the engine is disposed below a drive unit housing of the supercharger. The intercooler and the engine accessory are aligned along the cylinder bank.

Accordingly, the supercharger, the intercooler, and the engine accessory are arranged in a compact manner at the side of the engine body.

In another aspect, the intake manifold is made of metal. A fuel pump is located on a side opposite to the engine accessory with the intake air introduction pipe of the intake manifold and the intercooler interposed therebetween.

Accordingly, the supercharger, the intercooler, the engine accessory, and the fuel pump are arranged in a compact manner at the side of the engine body. In addition, the supercharger, the intake manifold, and the intercooler protect the fuel pump from any object that may collide with the engine.

Advantages of the Invention

According to the present invention, the supercharger extends along the cylinder bank at a side of the surge tank, and is fixed to the intake manifold. The intercooler is located below the supercharger. The case of the intercooler is connected to the discharge port of the supercharger and the intake air introduction pipe of the intake manifold. This configuration easily provides sufficient support rigidity of the supercharger and the intercooler, while reducing an increase in the overall height of the engine.

BRIEF DESCRIPTION OF THE DRAWINGS

FIG. 7 is a front view showing the arrangement of an intake manifold, an ISG, and a fuel pump.

DESCRIPTION OF EMBODIMENT

An embodiment of the present invention will now be described with reference to the drawings. The following description of preferred embodiment is only an example in nature, and is not intended to limit the scope, applications or use of the present invention.

Figure 1:
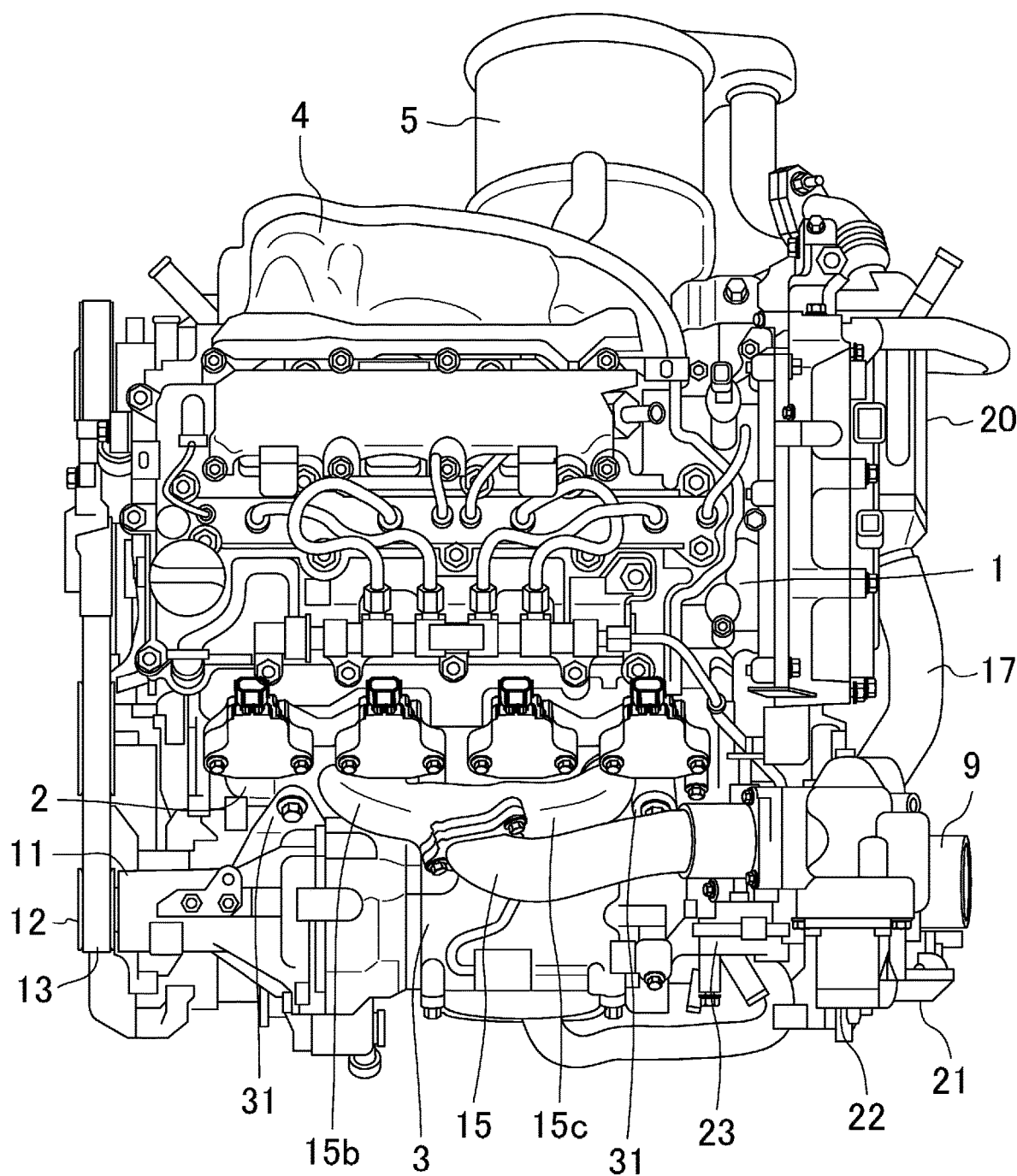
FIG. 1 is a plan view of an engine with a supercharger.

FIG. 1 shows a multi-cylinder engine with a supercharger for a motor vehicle. Reference numeral 1 denotes a cylinder head, reference numeral 2 denotes a surge tank of an intake manifold, reference numeral 3 denotes a supercharger that compresses intake air and supplies the compressed intake air to the surge tank 2, reference numeral 4 denotes an exhaust manifold, and reference numeral 5 denotes an exhaust gas purifier containing an oxidation catalyst and a particulate filter. The engine according to this embodiment is a front intake rear exhaust transverse engine with a cylinder bank (i.e., a crankshaft) extending in the transverse direction of the vehicle.

<Layout of Engine Parts>

Figure 2:
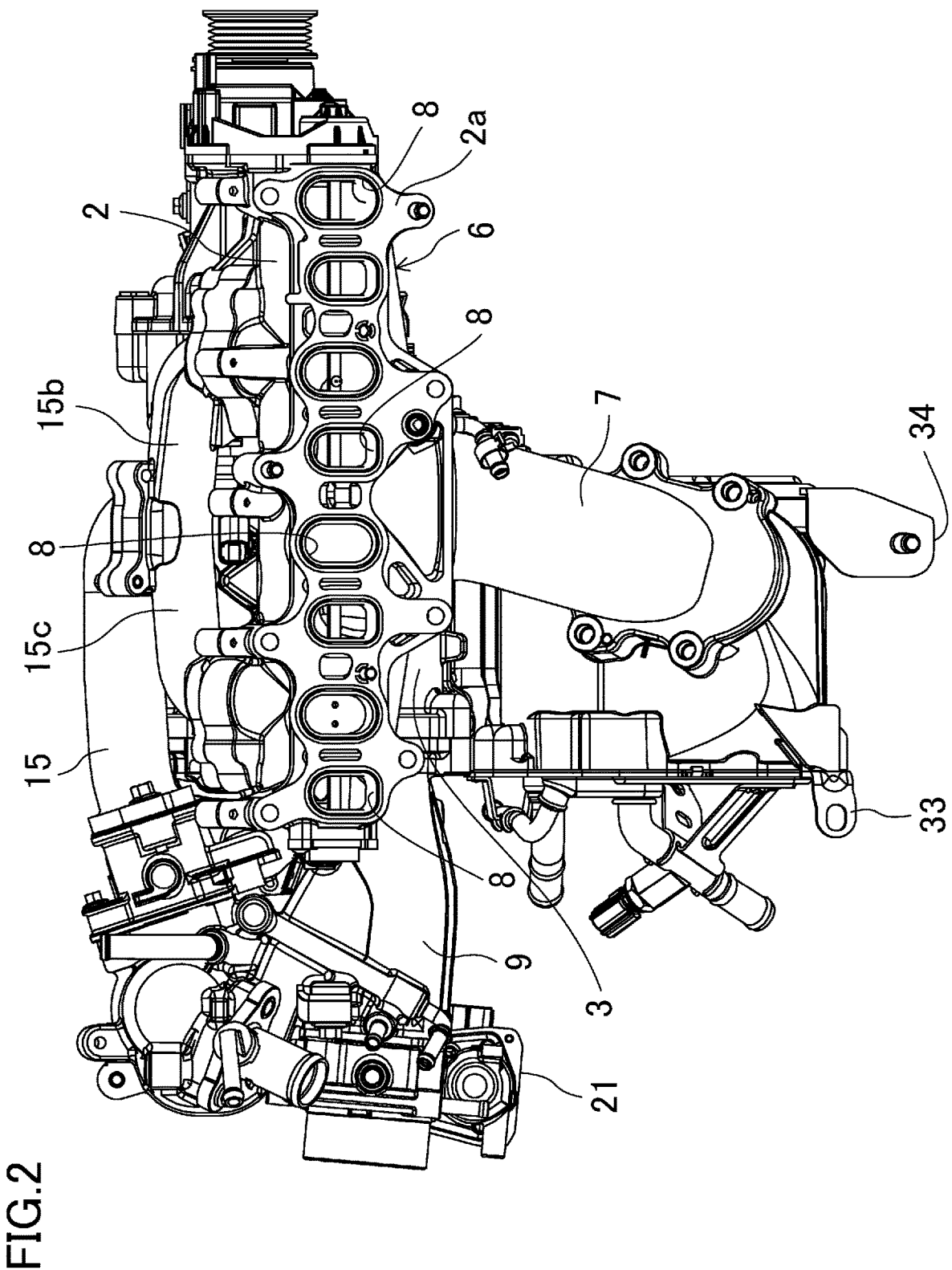
FIG. 2 is a rear view of an intake system of the engine.

The surge tank 2 extends along the cylinder bank at a side of the cylinder head 1 and is connected to intake ports of the cylinders of the engine. As shown in FIG. 2, the intake manifold 6 includes the surge tank 2 and an intake air introduction pipe 7 integral with the surge tank 2, and is made of metal (an aluminum alloy in this embodiment). The intake air introduction pipe 7 extends below the surge tank 2. FIG. 2 shows an intake system of the engine as viewed from an engine main body.

The engine of this example is a four-cylinder engine including two intake ports for each cylinder. The intake manifold 6 includes, in total, eight branch intake passages 8 corresponding to the respective intake ports (i.e., two intake ports per cylinder). Each branch intake passage 8 extends from the surge tank 2. The intake manifold 6 is fixed to the cylinder head 1 in a mounting position 2a around the surge tank 2 at the cylinder head 1.

Figure 3:
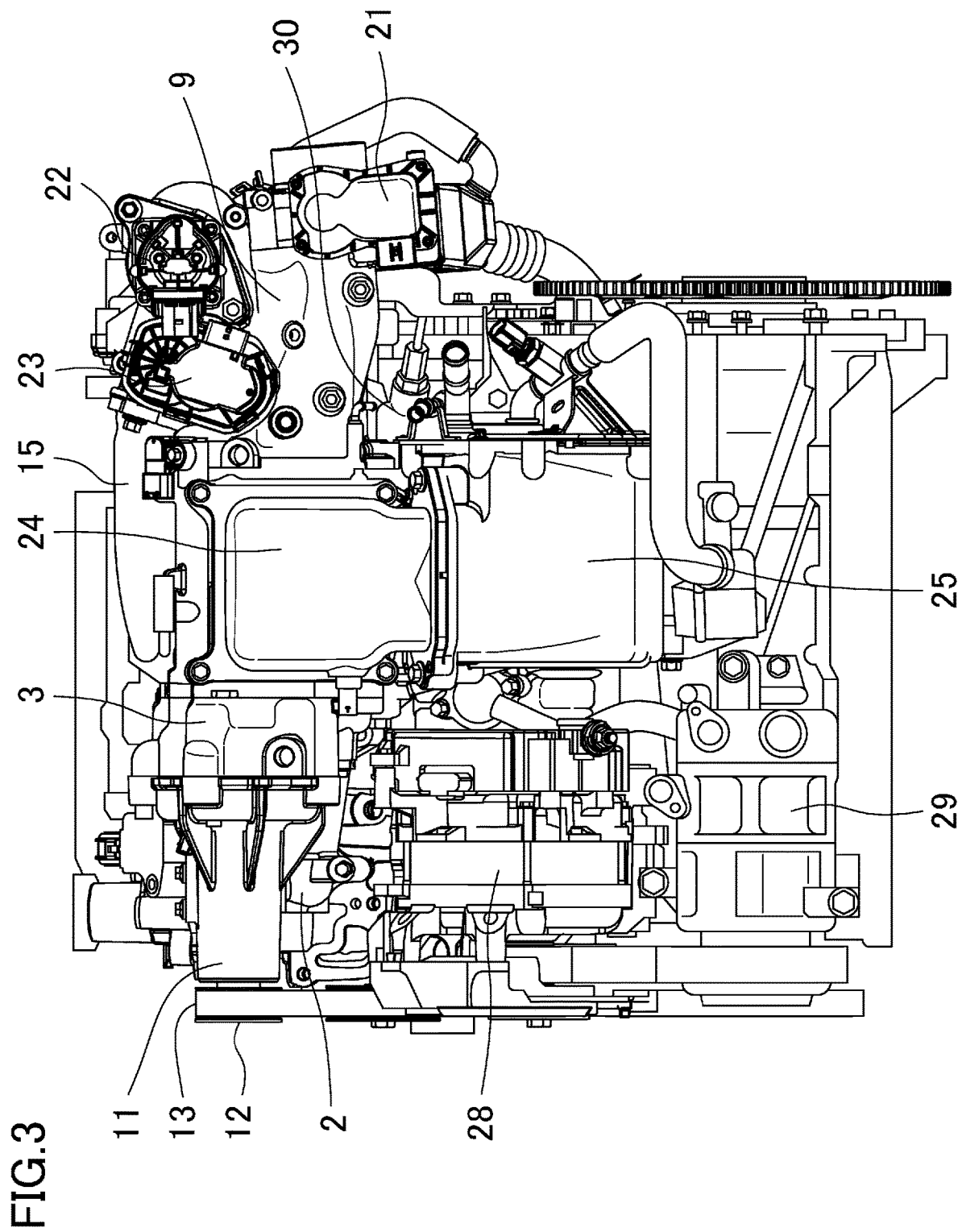
FIG. 3 is a front view of the engine with the supercharger.

The supercharger 3 is a mechanical supercharger driven by an output shaft of the engine and extends along the cylinder bank at a side and in front of the surge tank 2. As shown in FIG. 3 as well, the supercharger 3 is directly connected to an upstream intake pipe 9 extending along the cylinder bank. Intake air is introduced through the upstream intake pipe 9 into the supercharger 3.

At the end of the supercharger 3 opposite to the upstream intake pipe 9, a drive unit housing 11 for the supercharger 3 protrudes. This drive unit housing 11 houses, via bearings, a drive shaft for driving the supercharger 3 using the output shaft of the engine. The drive shaft is coupled to a pulley 12, which is wound with a transmission belt 13.

In order to guide intake air to the surge tank 2 while bypassing the supercharger 3, a bypass pipe 15 branches off from the upstream intake pipe 9.

Figure 4:
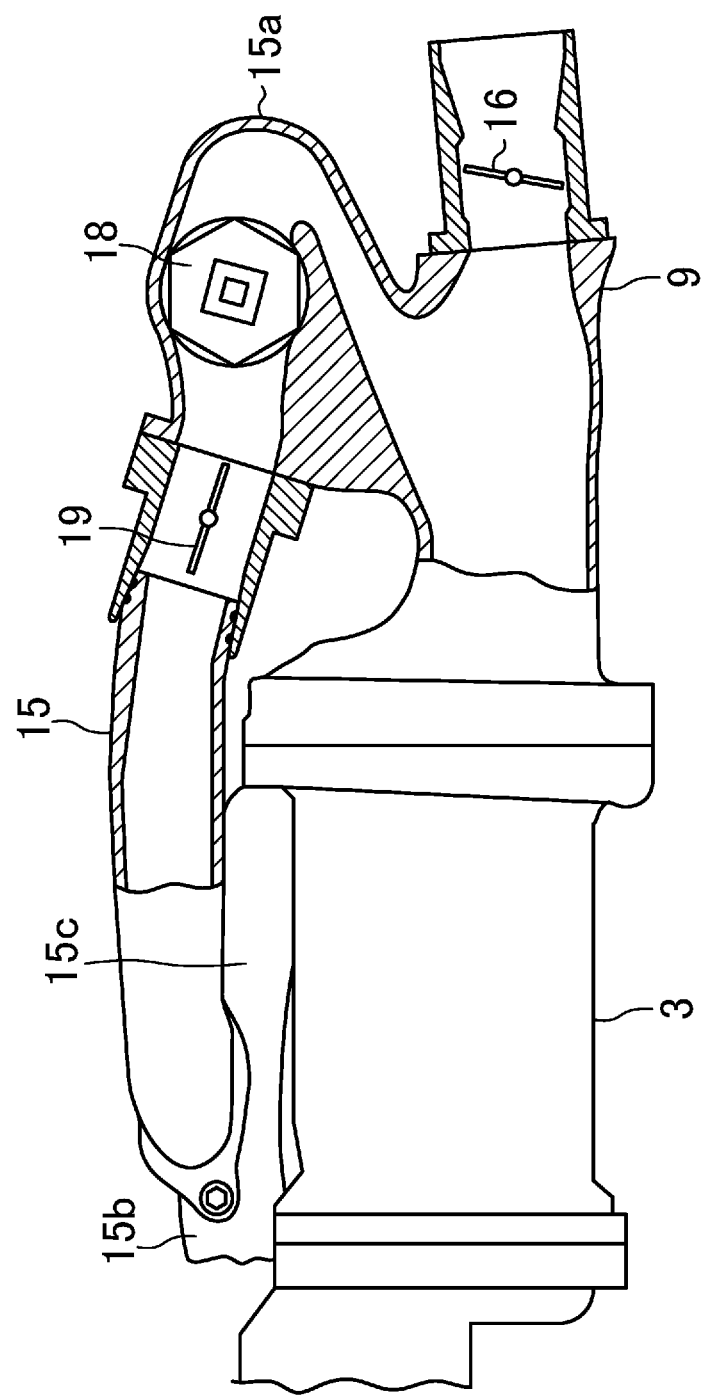
FIG. 4 is a front view of the supercharger, an upstream intake pipe, and other components, which are partially shown in cross section.

As shown in FIG. 4, the bypass pipe 15 branches off from the upper surface of the upstream intake pipe 9 downstream of a throttle valve 16 disposed in the upstream intake pipe 9. The bypass pipe 15 extends upstream of the upstream intake pipe 9 from the branch and then curves and turns back toward the downstream end of the upstream intake pipe 9.

Following the turn 15a, the bypass pipe 15 extends along the cylinder bank above the supercharger 3 toward the center of the surge tank 2.

Accordingly, as shown in FIG. 2, the bypass pipe 15 branches off into a first branch pipe 15b extending to one end of the cylinder bank and a second branch pipe 15c extending to the other end of the cylinder bank, around the center of the surge tank 2. The first and second branch pipes 15b and 15c are connected to the surge tank 2 in positions corresponding to the two cylinders on one side and the two cylinders on the other side of the cylinder bank, respectively.

Downstream of the turn 15a of the bypass pipe 15, an EGR pipe 17 that recirculates exhaust gas from an exhaust system to the intake system is connected as shown in FIG. 1. The EGR pipe 17 guides the exhaust gas from a position downstream of the particulate filter of the exhaust gas purifier 5 to the intake system. The EGR pipe 17 includes, in an intermediate position, an EGR cooler 20 that cools the exhaust gas to be recirculated to the intake system.

As shown in FIG. 4, a part of the bypass pipe 15 connected to the EGR pipe 17 is provided with an EGR control valve 18 that controls the recirculation of the exhaust gas. In addition, a part of the bypass pipe 15 downstream of the EGR control valve 18 is provided with a bypass control valve 19 that is closed while the supercharger 3 operates.

In FIG. 1, for example, reference numeral 21 denotes a drive unit for the throttle valve 16, reference numeral 22 denotes a drive unit for the EGR control valve 18, and reference numeral 23 denotes a drive unit for the bypass control valve 19.

Figure 5:
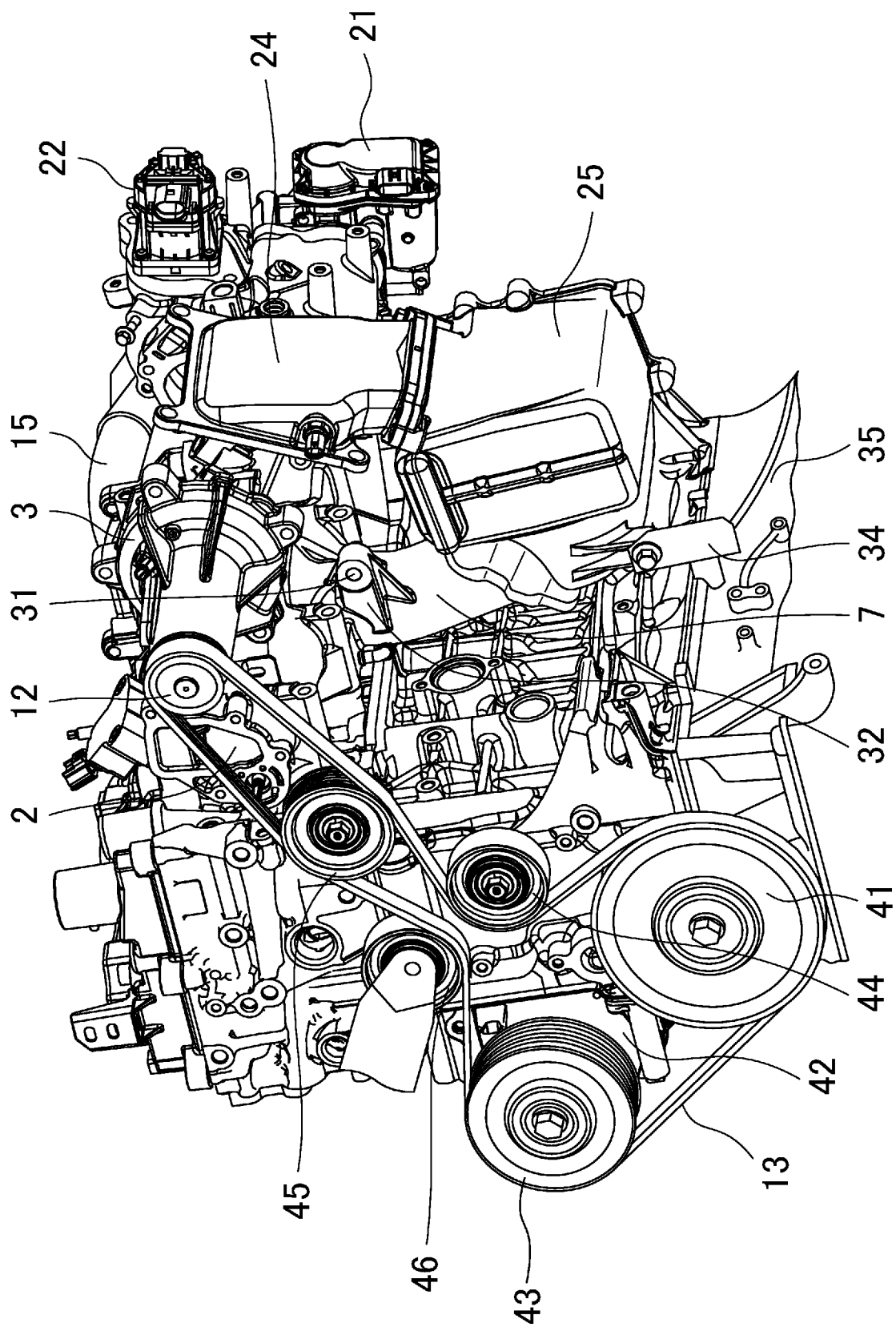
FIG. 5 is a perspective view of the engine with the supercharger.
Figure 6:
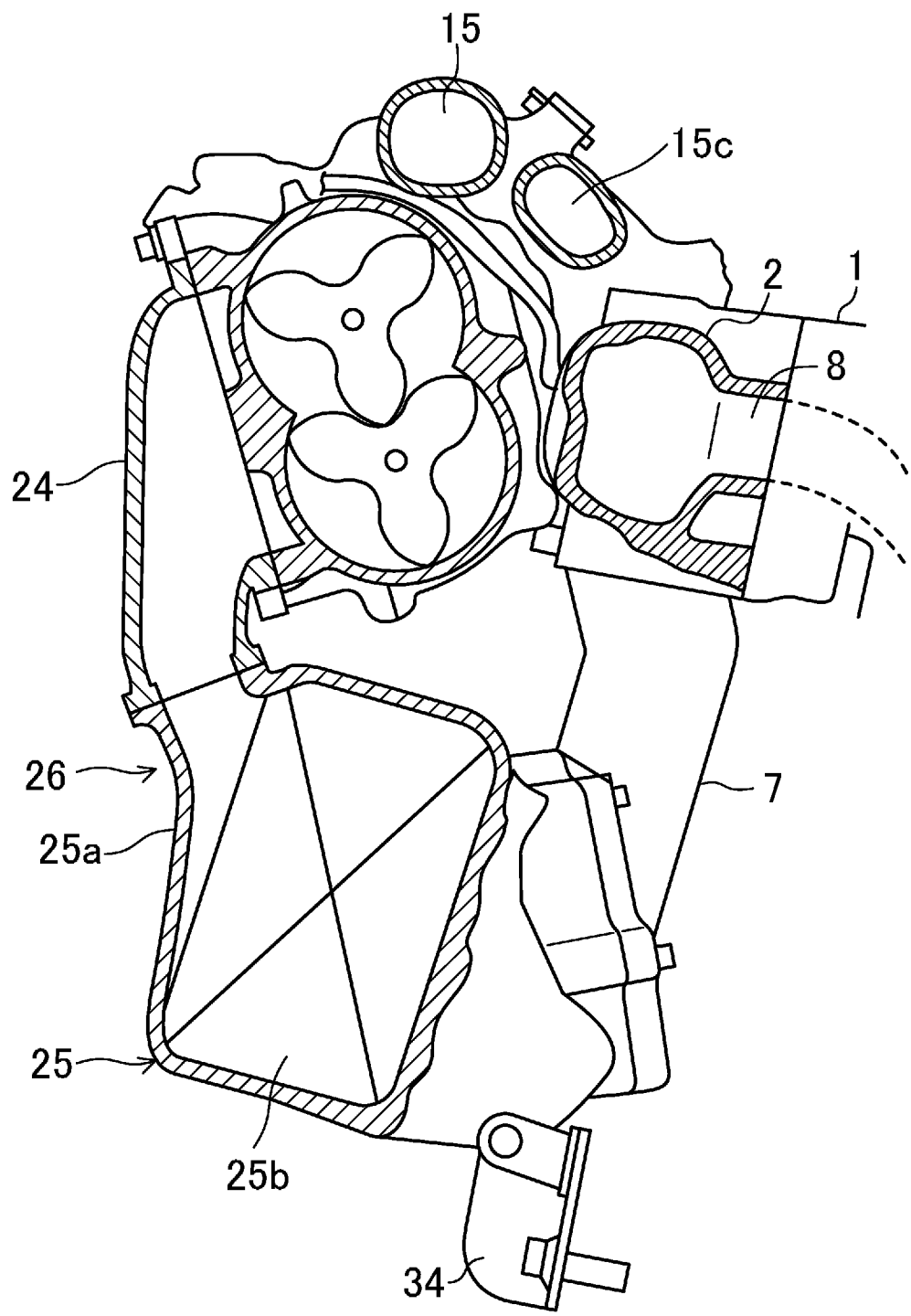
FIG. 6 is a cross-sectional view of the supercharger, a downstream intake pipe, and other components.

As shown in FIGS. 3 and 5, an upstream end of a supercharging discharge pipe 24 for guiding the compressed intake air to the surge tank 2 is connected to a discharge port on a side surface of the supercharger 3 and extends below the supercharger 3. The downstream end of the supercharging discharge pipe 24 is connected to an intercooler 25 located below the supercharger 3. The intercooler 25 cools the intake air discharged from the supercharger 3 and is connected to the intake air introduction pipe 7 of the intake manifold 6. As shown in FIG. 6, the intercooler 25 according to the present embodiment includes a case 25a made of the same metal (i.e., the aluminum alloy) as the intake manifold 6, and a water cooler core 25b housed in the case.

In this embodiment, the supercharging discharge pipe 24, the intercooler 25, and the intake air introduction pipe 7 constitute a downstream intake pipe 26 that guides the intake air from the supercharger 3 to the surge tank 2. As shown in FIGS. 5 and 6, the downstream intake pipe 26 is as a whole in a U-shape as viewed along the cylinder bank including the intercooler 25 at the bottom.

That is, the supercharger 3 is located above the intercooler 25. The supercharger 3 is interposed between the surge tank 2 and the supercharging discharge pipe 24. The lower part of the supercharger 3 is interposed between the intake air introduction pipe 7 and the supercharging discharge pipe 24, in other words, located inside the U-shape of the U-shaped downstream intake pipe 26.

As shown in FIG. 3, an integrated starter generator (ISG) 28 as an engine accessory is disposed in a space below the drive unit housing 11 of the supercharger 3 and next to the intercooler 25 in front view. The intercooler 25 and the ISG 28 are aligned along the cylinder bank. An air compressor 29 for air conditioning is disposed in a space below the ISG 28.

As shown in FIG. 7, a fuel pump 30 for injecting fuel into the cylinders is disposed on the side opposite to the ISG 28 with the intake air introduction pipe 7 of the intake manifold 6 interposed therebetween. That is, the fuel pump 30 is disposed next to the intake air introduction pipe 7 in front view. As shown in FIG. 3, the fuel pump 30 is located below the upstream intake pipe 9 and on the back of the intercooler 25 as viewed from the front of the vehicle.

<Features of Layout>

As shown in FIG. 1, the placement of the supercharger 3 at the side of the surge tank 2 prevents the supercharger 3 from increasing the overall height of the engine. The bypass pipe 15 is located above the supercharger 3 and branches off around the center of the surge tank 2 to be connected to both sides of the surge tank 2 along the cylinder bank. This configuration improves the distribution of the intake air to the cylinders. While located above the supercharger 3, the bypass pipe 15 itself is not bulky, which reduces an increase in the overall height of the engine.

As shown in FIGS. 5 and 6, the downstream intake pipe 26 connecting the supercharger 3 to the surge tank 2 extends below the supercharger 3, and the intercooler 25 is located below the supercharger 3. This configuration prevents the intercooler 25 from increasing the overall height of the engine.

As shown in FIGS. 5 and 6, in the employed configuration, the supercharger 3 is interposed between the surge tank 2 and the supercharging discharge pipe 24, and the lower part of the supercharger 3 is located inside the U-shape of the downstream intake pipe 26. Accordingly, the series of intake system components: the surge tank 2; the supercharger 3; and the downstream intake pipe 26 are arranged in a compact manner at the side of the engine body, while smoothing the flow of intake air from the supercharger 3 to the surge tank 2.

As shown in FIG. 4, the EGR control valve 18 is located in the bypass pipe 15 passing above the supercharger 3. This arrangement easily discharges even the condensed water caused by cooling the EGR gas and adhering to the EGR control valve 18. That is, once the supercharger 3 operates, the condensed water adhering to the EGR control valve 18 is discharged from the branch of the bypass pipe 15 through the supercharger 3 to the surge tank 2. This reduces erroneous operation of the EGR control valve 18 caused by the condensed water.

As shown in FIGS. 2 and 3, the water intercooler 25 is disposed in a lower position below the supercharger 3. This arrangement facilitates the routing of the cooling water circulation pipe that connects even a radiator located in a low position in front of the engine to the intercooler. In particular, the cooling water circulation pipe is shortened and requires a smaller amount of the cooling water, which is advantageous in reducing the weight of the motor vehicle.

As shown in FIGS. 3 and 7, the fuel pump 30 is located in the space next to the intake air introduction pipe 7 of the intake manifold 6 and below the upstream intake pipe 9 in front view, and, in addition, located behind the intercooler 25 as viewed from the front of the vehicle. The intake manifold 6 and the case 25a of the intercooler 25 are made of metal. In case of collision with an object at the front of the vehicle, the supercharger 3, the intake manifold 6, and the intercooler 25 protect the fuel pump 30 from the object.

As shown in FIG. 3, the ISG 28 is located in the space below the drive unit housing 11 of the supercharger 3 and next to the intercooler 25 in front view, and the air compressor 29 is located in the space below the ISG 28. That is, the space in front of the engine is more efficiently used to arrange the engine accessories, for example, which leads to a compact engine as a whole.

<Drive System for Accessories>

As shown in FIG. 5, the transmission belt 13 that drives the supercharger 3 is wound around a crank pulley 41 coupled to the crankshaft of the engine, the pulley 12 of the supercharger 3, and a pulley 43 coupled to a drive shaft of a water pump 42. Idlers 44 and 45 and a tension pulley 46 apply appropriate tensions to the transmission belt 13. The pulleys 12 and 43 of the supercharger 3 and the water pump 42 have appropriate winding angles.

<Support Structure of Supercharger 3 and Intercooler 25>

The support structure of the supercharger 3 and the intercooler 25 will now be described.

As shown in FIG. 1, the supercharger 3 is fixed to the surge tank 2 with bolts 31 at the end closer to the upstream intake pipe 9 and at two points of the drive unit housing 11. As shown in FIG. 5, the lower part of the supercharger 3 is fixed to a bracket 32 of the intake air introduction pipe 7 of the intake manifold 6 with the bolts 31.

In this manner, the supercharger 3 is fixed to the intake manifold 6 to provide sufficient support rigidity.

As shown in FIGS. 3, 5 and 6, the intercooler 25 is configured as follows. The intake air inlet of the case 25a is coupled to the lower end of the supercharging discharge pipe 24 that is coupled to the discharge port of the supercharger 3. The intake air outlet of the case 25a is coupled to the lower end of the intake air introduction pipe 7 of the intake manifold 6. In addition, as shown in FIG. 2, the brackets 33 and 34 are fixed to both the lower end corners of the intercooler 25 to fix the intercooler 25 to a cylinder block 35 via the brackets 33 and 34 (see FIG. 5). That is, the lower end of the intercooler 25 is supported by the cylinder block 35.

In this way, the intercooler 25 is connected to the supercharger 3 and the intake manifold 6 and supported by the cylinder block 35 to provide sufficient support rigidity.

<Others>

While the front intake rear exhaust transverse engine is used in the embodiment described above, the present invention is also applicable to a vertical engine with the cylinder bank (i.e., the crankshaft) extending in the longitudinal direction of the vehicle.

The material of the case 25a of the intercooler 25 is not limited to metal but may be a resin.

DESCRIPTION OF REFERENCE CHARACTERS

1 Cylinder Head
2 Surge Tank
3 Supercharger
6 Intake Manifold
7 Intake Air Introduction Pipe
9 Upstream Intake Pipe
11 Drive Unit Housing
15 Bypass Pipe
18 EGR Control Valve
24 Supercharging Discharge Pipe
25 Intercooler
25a Case
25b Water Cooler Core
26 Downstream Intake Pipe
28 ISG (Engine Accessory)
29 Air Compressor (Engine Accessory)
30 Fuel Pump

The invention claimed is:

1. An engine with a supercharger, the engine comprising:
an intake manifold including a surge tank connected to intake ports of cylinders of the engine that is a multi-cylinder engine, and an intake introduction pipe integral with the surge tank;
a supercharger configured to compress intake air and supply the compressed intake air to the surge tank; and
an intercooler configured to cool the intake air discharged from the supercharger, wherein
the supercharger extends along the cylinder bank at a side of the surge tank, and is fixed to the intake manifold,
the intercooler is located below the supercharger, and
a case housing a cooler core of the intercooler includes an intake air inlet connected to a discharge port of the supercharger, and an intake air outlet connected to the intake air introduction pipe of the intake manifold.

2. The engine of claim 1, wherein
a lower part of the case of the intercooler is supported by a cylinder block.

3. The engine of claim 2, wherein
the cooler core of the intercooler is a water cooler core.

4. The engine of claim 3, wherein
the supercharger is a mechanical supercharger driven by an output shaft of the engine,
an engine accessory driven by the output shaft of the engine is disposed below a drive unit housing of the supercharger, and
the intercooler and the engine accessory are aligned along the cylinder bank.

5. The engine of claim 4, wherein
the intake manifold is made of metal, and
a fuel pump is located on a side opposite to the engine accessory with the intake air introduction pipe of the intake manifold and the intercooler interposed therebetween.

6. The engine of claim 2, wherein
the supercharger is a mechanical supercharger driven by an output shaft of the engine,
an engine accessory driven by the output shaft of the engine is disposed below a drive unit housing of the supercharger, and
the intercooler and the engine accessory are aligned along the cylinder bank.

7. The engine of claim 6, wherein
the intake manifold is made of metal, and
a fuel pump is located on a side opposite to the engine accessory with the intake air introduction pipe of the intake manifold and the intercooler interposed therebetween.

8. The engine of claim 1, wherein
the cooler core of the intercooler is a water cooler core.

9. The engine of claim 8, wherein
the supercharger is a mechanical supercharger driven by an output shaft of the engine,
an engine accessory driven by the output shaft of the engine is disposed below a drive unit housing of the supercharger, and
the intercooler and the engine accessory are aligned along the cylinder bank.

10. The engine of claim 9, wherein
the intake manifold is made of metal, and
a fuel pump is located on a side opposite to the engine accessory with the intake air introduction pipe of the intake manifold and the intercooler interposed therebetween.

11. The engine of claim 1, wherein
the supercharger is a mechanical supercharger driven by an output shaft of the engine,
an engine accessory driven by the output shaft of the engine is disposed below a drive unit housing of the supercharger, and
the intercooler and the engine accessory are aligned along the cylinder bank.

12. The engine of claim 11, wherein
the intake manifold is made of metal, and
a fuel pump is located on a side opposite to the engine accessory with the intake air introduction pipe of the intake manifold and the intercooler interposed therebetween.

* * * * *